July 28, 1931. G. W. PRATHER Re. 18,138

WHEEL TESTING MACHINE

Original Filed Jan. 13, 1926 2 Sheets-Sheet 1

INVENTOR
GEORGE W. PRATHER
BY Charles S. Coons
HIS ATTORNEY.

July 28, 1931. G. W. PRATHER Re. 18,138

WHEEL TESTING MACHINE

Original Filed Jan. 13, 1926 2 Sheets-Sheet 2

INVENTOR
GEORGE W. PRATHER
BY Charles S. Evans
HIS ATTORNEY.

Reissued July 28, 1931 Re. 18,138

UNITED STATES PATENT OFFICE

GEORGE W. PRATHER, OF SANTA CRUZ, CALIFORNIA

WHEEL TESTING MACHINE

Original No. 1,598,009, dated August 31, 1926, Serial No. 80,946, filed January 13, 1926. Application for reissue filed July 23, 1928. Serial No. 294,859.

This invention relates to improvements in wheel testing machines and particularly to such machines for testing the deviation of an automobile wheel from a preconceived plane of rotation in which it should lie for ease of steering and minimum of wear on the tires. To facilitate steering, the front wheels of an automobile are usually given a certain amount of camber or cant; that is, they are tipped outwardly from a vertical plane. This of course has the effect of making the effective wheel diameter greater on the inside of the tread than on the outside, which tends to cause the front wheels to run outwardly or separate. To counteract this, and give the effect, so far as concerns the road contact, of a wheel rolling over the road in a vertical plane without grinding or side slippage wear, the wheels are turned inwardly or toed in. The proper camber and toe-in are especially important in the balloon and low pressure tires if excessive and unnecessary wear is to be avoided.

Frequently wheels adjusted with the proper toe-in when new have the toe-in changed or actually reversed to a toe-out, by the axle or tie rod being bent in various ways while in use. This of course is highly detrimental both to steering and to tire wear, and should be checked up and remedied at the first opportunity.

It is hard, however, to determine the proper toe-in by the naked eye, and the ordinary means for gaging the toe-in by a tape or similar measure as is commonly used, is inadequate, since it is hard to adjust such measure with sufficient accuracy to insure proper results.

The principal object of my invention, therefore, is to provide a device for automatically indicating the exact amount of toe-in (or the reverse) which the wheels may have, in excess of the proper toe-in, as determined by the camber, so that adjustment may be made. Another object of the invention is to provide a testing machine of the described character, with which tests may be carried out under conditions substantially the same as when the vehicle is travelling along the road.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Referring now more particularly to the characters of reference on the drawings, 1 and 2 denote smooth faced drums of a certain diameter and width of face, spaced apart between centers the same as the standard gage of automobile wheels.

Figure 1:
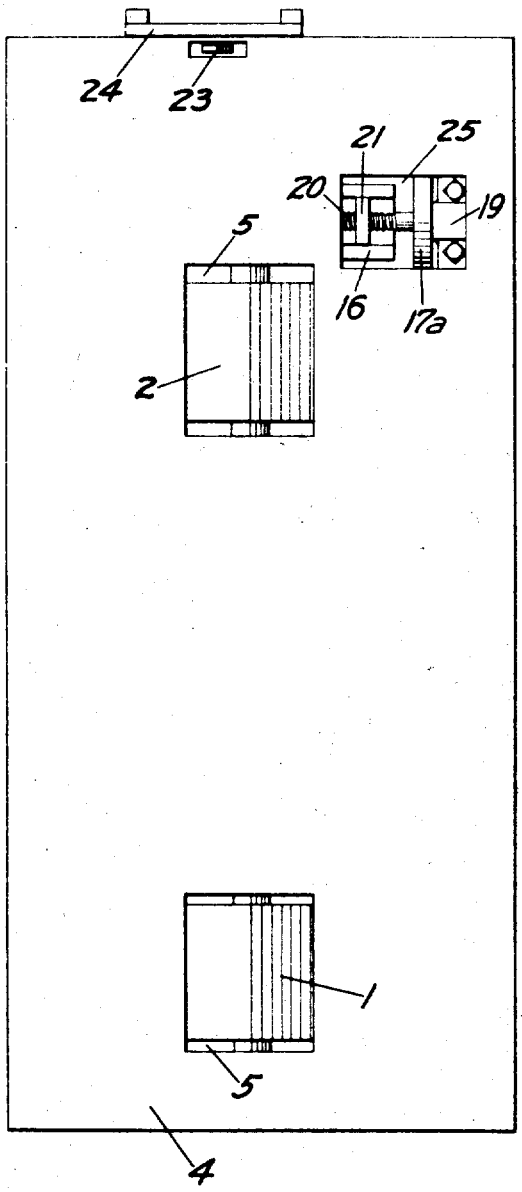
Fig. 1 is a top plan view of the structure.
Figure 2:
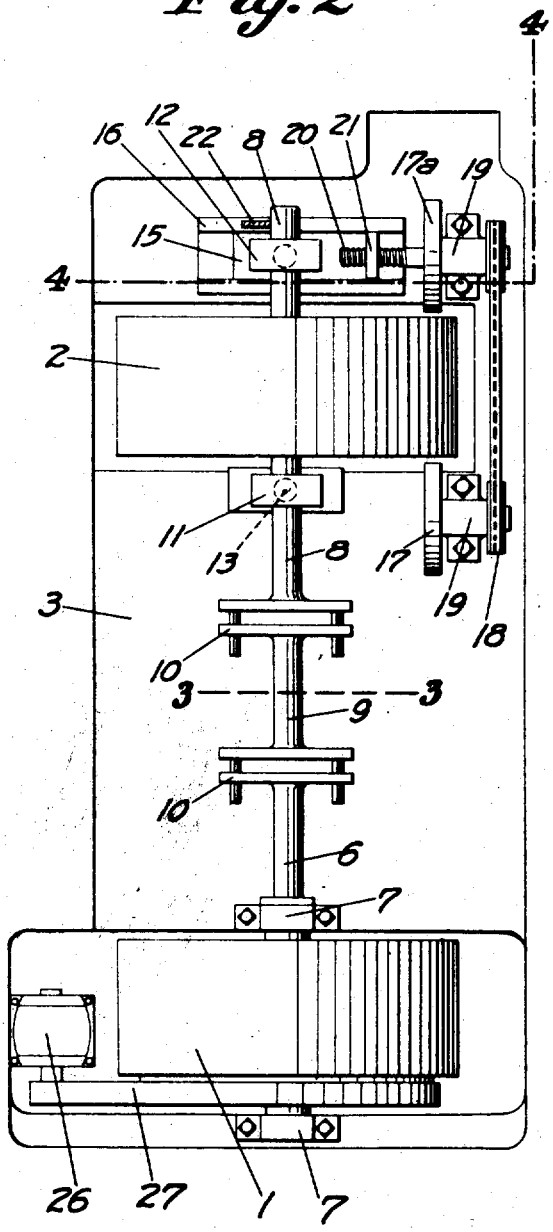
Fig. 2 is a similar view but with the floor or cover plate removed.
Figure 3:
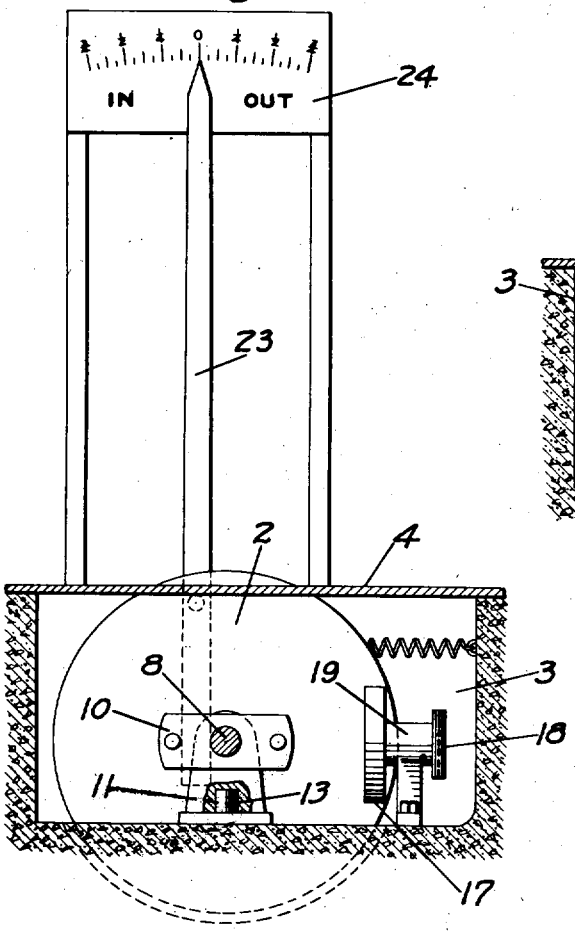
Fig. 3 is a transverse section on the line 3—3 of Fig. 2.
Figure 4:
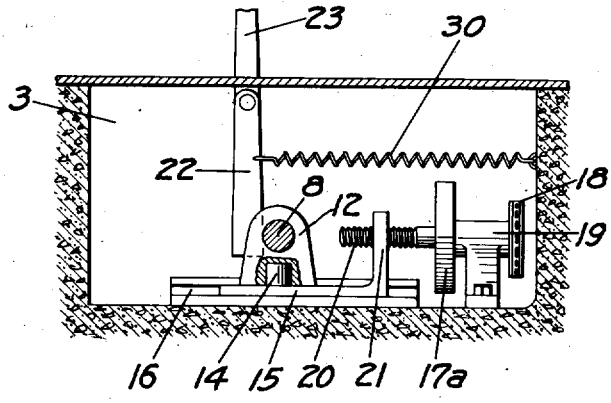
Fig. 4 is a similar view on the line 4—4 of Fig. 2.

These drums are set in a pit 3, sunk in the floor of the garage or other place where tests are to be carried out, the pit being covered by a level plate 4, having openings 5, through which the drums project slightly, as shown in Fig. 3.

The drum 1 is fixed onto a shaft 6, journaled in bearings 7 between which the drum is immovable axially. The drum 2 is splined onto a shaft 8. The shafts 6 and 8 are connected in driving relation to each other by means of an intermediate length of shaft 9 and flexible or universal joints 10, of known design interposed between said shaft 9 and the shafts 6 and 8. The shaft 8 is slidably journaled in bearings 11 and 12, which are spaced apart a sufficient distance to allow a certain axial sliding movement of the drum 2. The bearing 11 is mounted on a vertical pivot 13, which is rigidly fixed against movement. The bearing 12 is mounted on a similar pivot 14, which in turn is mounted on a plate 15. This plate is slidably mounted in a fixed slide 16, for movement in a plane at right angles to the normal rotational axis of the drum.

Mounted adjacent the sides of the drum 2, are friction wheels 17 and 17*a*, connected in driving relation with each other by a chain drive 18 or the like.

These wheels are mounted in fixed bearings 19, and are normally spaced somewhat from the opposite side faces of the drum. The center of the friction wheel 17*a* is alined with the plate 15; and said wheel is mounted in connection with a screw 20, which is threaded through a lug 21, projecting through from the adjacent end of the plate 15.

The shaft 8 projects beyond the bearing 12; the lower end of a vertical pivoted arm 22 bearing against one side of the shaft. The upper portion of this arm, above the plate 4, is formed as an indicating finger 23, which reads against a graduated dial board 24 mounted a predetermined distance above said plate. The members 22 and 23 may be made as a single piece in a common vertical plane or they may be offset from each other, as shown, so that the dial board 24 may be located some distance to one side of the drum 2.

A window 25 is preferably provided in the floor plate 4, outwardly of the drum 2, and over the adjacent friction wheel 17*a*, so that the operator, if he desires, may see the working of said wheel.

The drums are driven at slow speed by suitable means, such as a motor 26, connected to the drum 1 by a belt drive 27.

In operation, the front wheels 28 of the automobile to be tested are driven onto the drums 1 and 2, so that the axes of the wheels and drums are vertically alined. The rear end of the car is then jacked up under the differential in such a manner as to cause the car to be pivoted at its rear end, so that the front end may swing sideways.

The motor 26 is then started up, being arranged to run in that direction which will rotate the drums so that the wheels 28 turn in the same direction, as when actually engaged with the road. The steering wheel of the car is then turned and held in such a position that the right hand wheel resting on the drum 1 is toed in just the right amount. This will be apparent by absence of swinging of the car sideways, because with proper toe-in, there is no tendency for the wheel to run along the drum in an axial direction; and hence the car remains fixed. When all tendency of the car to swing sideways is corrected by movement of the steering wheel, the right hand wheel on the drum 1 is exactly in the right position as to toe-in; and all error that may have existed in the alinement of the wheels; that is the excess of toe-in is totalized in the other or left hand wheel resting on the drum 2.

If error in the alinement exists the tendency for the drum 2 is then to shift axially in one direction or the other depending on whether the wheel resting thereon toes in or out.

Figure 6:
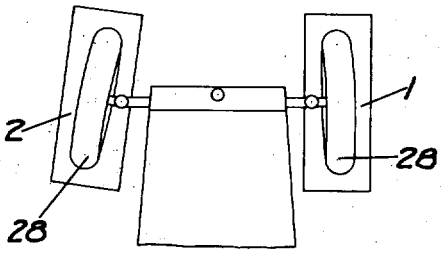
Fig. 6 is a similar view showing the ultimate position assumed by the indicating drum.
Figure 5:
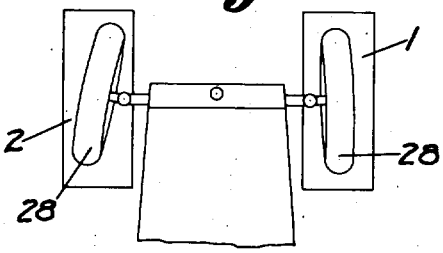
Fig. 5 is a fragmentary diagrammatic view showing the initial setting of the axles on the revolving drums.

Assuming that the wheel toes in as shown in Fig. 5, the drum 2 will move away from the drum 1, which is immovable, until it engages the friction wheel 17*a*. This wheel then rotates, causing the screw 20 to turn. This in turn causes the plate 15 to move lengthwise and the drum 2 and its shaft 8 to shift laterally or arcuately into a position such that the rotational axis of the drum, as well as the shaft, is at an angle to its original position. This movement of the drum will continue until the drum 2 reaches the position shown in Fig. 6, at which point the wheel and drum are rolling together with no tendency for the drum to move axially. The angular shifting or lateral movement of the rotational axis of the drum to this position is, therefore, a measure of the error in the toe-in, and means are provided for evaluating this movement.

With this angular movement of the drum 2 and shaft 8, the shaft recedes from the arm 22, but the latter will follow up the shaft on account of a tension spring 30, which is connected thereto, and which pulls said arm constantly against the shaft. The finger 23 will therefore move along the dial board from the neutral or zero mark, until it points to a graduation thereon on the toe-in side of said zero mark.

When the finger moves as far as it shows any tendency to go, the operator stops the motor.

Corrections if necessary are then made by the usual methods employed, without removing the wheels from the drums. The latter are then again rotated to make a final test of the wheel alinement, at which time the finger 23 should point to the zero mark on the scale, since with correct toe-in there will be no lateral shifting of the drum 2.

As before indicated, when the drums are axially alined with each other, the finger 23 points to the zero mark, and any wheels turning on the drums and causing the latter to run thus alined will have the correct amount of toe-in. This does not mean that the wheels themselves are running parallel, but that they are rotating with correct toe-in and without any side friction on the drums with which they contact, and which correspond to the road.

The graduations on the dial board 24, while representing fractions of inches, are of course spaced apart considerably greater than their natural size, but are proportioned relative to the movement of the drum, so as to give accurate results.

The large size of these graduations is of course a benefit rather than a detriment, since it enables adjustments to be made to within a very small fraction of an inch.

If the wheels toe-out, the drum 2 will automatically shift axially in the opposite direction, causing the wheel 17 to be engaged and causing an angular movement of the drum in the direction opposite to that above described.

This in turn causes the shaft 8 to bear against and press the arm 22, so as to move the finger 23 in the opposite direction across the dial board.

From the foregoing description, it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

I claim:

1. A device for indicating the toe-in of a vehicle wheel including a driven drum arranged to support one wheel of the vehicle, a shaft on which the drum is mounted, bearings in which the shaft is slidably and turnably mounted and arranged to permit of axial movement of the drum therebetween, a rotatable screw secured against longitudinal movement and applied to one of the bearings to move the same horizontally and at right angles to the shaft when the screw turns thus imparting pivotal movement to the shaft, means actuated by axial movement of the drum in one direction or the other for causing the screw to turn in one direction or the other, indicating means, and means operatively connecting said drum and indicating means whereby the latter is actuated upon pivotal movement of the shaft caused by such movement of the movable bearing.

2. A device for indicating the toe-in of a vehicle wheel including a driven drum arranged to support one wheel of the vehicle, a shaft on which the drum is mounted, bearings in which the shaft is slidably and turnably mounted and arranged to permit of axial movement of the drum therebetween, a rotatable screw secured against longitudinal movement and applied to one of the bearings to move the same horizontally and at right angles to the shaft when the screw turns thus imparting pivotal movement to the shaft, friction wheels connected in driving relation with the screw and with each other and disposed on opposite sides of the drum in normally spaced relation thereto, whereby when the drum moves axially one friction wheel or the other will be rotated to impart rotation to the screw and move the bearing, indicating means, and means operatively connecting said drum and indicating means whereby the latter is actuated upon such movement of the bearing.

3. In a wheel testing machine, a drum against which the wheel to be tested may rest, means for mounting said drum for rotary, axial and arcuate movements; means for rotating the drum; and means actuated by said drum in its axial movement for causing arcuate movement thereof.

4. In a wheel testing machine, a drum against which the wheel to be tested may rest, means for mounting said drum for rotary, axial and arcuate movements; means for rotating the drum; means actuated by said drum in its axial movement for causing arcuate movement thereof; a graduated scale, and means for evaluating on the scale said arcuate movement.

5. In a wheel testing machine, a drum against which the wheel to be tested may rest, means for mounting said drum for rotary, axial and arcuate movements; means for rotating the drum; a wheel adjacent the drum and adapted to engage the drum upon axial movement of the drum, and means actuated by said last named wheel for arcuately moving the drum.

6. In a wheel testing machine, a drum against which the wheel to be tested may rest, means for mounting said drum for rotary, axial and arcuate movements; means for rotating the drum; a pair of wheels arranged for simultaneous rotation and disposed for engagement of the drum with one of the wheels upon axial movement of the drum in either direction, and means actuated by either of said pair of wheels for arcuately moving the drum.

7. In a wheel testing machine, a drum against which the wheel to be tested may rest, a shaft upon which said drum is mounted for rotation therewith and axial movement therealong, means for rotating said shaft, a bearing for supporting one end of said shaft and movable transversely with respect thereto, and means actuated by said drum in its axial movement for moving said bearing.

8. In a wheel testing machine, a drum against which the wheel to be tested may rest, a shaft upon which said drum is mounted for rotation therewith and axial movement therealong, means for rotating said shaft, a bearing for supporting one end of said shaft and movable transversely with respect thereto, and means actuated by said drum in its axial movement in either direction for effecting a corresponding movement of the bearing.

9. In a wheel testing machine, a drum against which the wheel to be tested may rest, a shaft upon which said drum is mounted for rotation therewith and axial movement therealong, means for rotating said shaft, a bearing for supporting one end of said shaft and movable transversely with respect thereto, means actuated by said drum in its axial movement in either direction for effecting a corresponding movement of the bearing, a graduated scale, and means for evaluating on the scale movement of the bearing in either direction.

10. An automobile wheel testing machine; comprising a pair of drums against which opposite wheels of the automobile may rest; journal means to support the first drum for rotation in a single position; journal means to support the second drum for rotary, axial and arcuate movements; means actuated by the second drum in its axial movement for effecting arcuate movement thereof; and means for rotating said drums.

11. An automobile wheel testing machine; comprising a pair of drums against which opposite wheels of the automobile may rest; journal means to support the first drum for rotation in a single position; journal means to support the second drum for rotary, axial and arcuate movements; a pair of wheels arranged for simultaneous rotation and disposed for engagement of the second drum with one of the wheels upon axial movement of the second drum in either direction; means actuated by either of said wheels for effecting arcuate movement of the second drum, and means for rotating said drums.

12. In a wheel testing machine, a rotatable drum against which the wheel to be tested may contact, and means for mounting the drum to permit angular movement of the rotational axis thereof, whereby upon rotation of the contacting drum and wheel the rotational axis of the drum may shift.

13. In a wheel testing machine, a drum against which the wheel to be tested may contact, journal means for said drum, and means for mounting the journal means to permit angular movement of the rotational axis of the drum to a position in which the reaction effect of the wheel on the drum tending to move it axially disappears upon rotation of the contacting drum and wheel.

14. In a wheel testing machine, a rotatable drum against which the wheel to be tested may contact, a shaft upon which the drum is mounted, and a pivotal support for said shaft and about which the drum and shaft are angularly movable under the influence of said wheel.

15. In a wheel testing machine, a rotatable drum against which the wheel to be tested may contact, means for rotating said drum, means for mounting said drum to allow displacement of the axis of rotation of said drum in an arcuate path to a position in which the reaction effect of the wheel on said drum which tends to move it axially disappears, means for effecting such displacement, and means for evaluating the same.

16. A machine for testing the amount of misalinement of a vehicle wheel comprising a rotatable drum against which the wheel to be tested may contact, supporting means for said drum including a pivot about which the axis of the drum may move angularly under the influence of said wheel and upon rotation of the drum and wheel, and means for effecting such rotation.

17. A machine for testing the amount of misalinement of a vehicle wheel comprising a rotatable drum against which the wheel to be tested may contact, a shaft upon which the drum is mounted, a pivotal support for said shaft and about which the shaft and axis of the drum may move angularly under the influence of said wheel and upon rotation of the drum and wheel, and means for rotating the drum.

18. A machine for testing the amount of misalinement of a vehicle wheel comprising a rotatable drum against which the wheel to be tested may contact, a shaft upon which the drum is mounted, a pivotal support for said shaft and about which the shaft and axis of the drum may move angularly under the influence of said wheel, means for rotating the drum, and means actuated by said angular movement of the drum for indicating the degree of angular movement thereof.

In testimony whereof I have hereunto set my hand this 26th day of June, 1928.

GEORGE W. PRATHER.